United States Patent
Feldotte et al.

(10) Patent No.: US 9,523,603 B2
(45) Date of Patent: Dec. 20, 2016

(54) WEIGHING COMPARTMENT WITH INTEGRATED BALANCE

(71) Applicant: Sartorius Lab Instruments GmbH & Co. KG, Goettingen (DE)

(72) Inventors: Heinrich Feldotte, Goettingen (DE); Michael Laubstein, Goettingen (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 715 days.

(21) Appl. No.: 13/956,852

(22) Filed: Aug. 1, 2013

(65) Prior Publication Data

US 2013/0333957 A1    Dec. 19, 2013

Related U.S. Application Data

(63) Continuation of application No. PCT/EP2012/000328, filed on Jan. 25, 2012.

(30) Foreign Application Priority Data

Feb. 1, 2011    (DE) .................... 10 2011 000 429

(51) Int. Cl.
*B01L 99/00*    (2010.01)
*B08B 15/02*    (2006.01)
(Continued)

(52) U.S. Cl.
CPC ............... *G01G 21/22* (2013.01); *B01L 99/00* (2013.01); *B08B 15/023* (2013.01); *G01G 21/28* (2013.01);
(Continued)

(58) Field of Classification Search
CPC .... G01G 21/28; G01G 21/283; G01G 21/286; G01G 21/22; G01G 23/30; G01G 23/32; G01G 23/34; G01G 23/37; G01G 21/30; B08B 15/023; B01L 99/00; B01L 2200/141; B01L 2300/025
See application file for complete search history.

(56) References Cited

U.S. PATENT DOCUMENTS 1,189,417 A * 7/1916 Zimmerman ........ G01G 21/286
                                                            177/180
4,821,821 A * 4/1989 Kelley ................... G01G 21/30
                                                            177/181
(Continued)

FOREIGN PATENT DOCUMENTS

DE    10 2009 000 653 A1    8/2010
EP         1 354 643 A2    10/2003
(Continued)

OTHER PUBLICATIONS

Thornwood. "Combination Keypad/Scale Using Strain Gauge Transducers." IBM Technical Disclosure Bulletin, International Business Machines Corp. vol. 34, No. 9, Feb. 1, 1992, pp. 77-78.*

*Primary Examiner* — Randy W Gibson
(74) *Attorney, Agent, or Firm* — Edell, Shapiro & Finnan, LLC

(57) ABSTRACT

A weighing compartment (10) having a work surface (22), including a balance which is integrated into the weighing compartment and which has a scale pan (24) arranged on the work surface (22), and at least one operation surface (26) which is arranged within the area of the work surface (22). The work surface (22) is formed by the surface of a smooth, continuous plate (20) and the operation surface (26) is integrated into the work surface (22) and is designed as a sensor panel, wherein a sensor (28) is arranged below the plate which forms the work surface.

18 Claims, 4 Drawing Sheets

(51) Int. Cl.
*G01G 21/28* (2006.01)
*G01G 21/30* (2006.01)
*G01G 21/22* (2006.01)
*G01G 23/37* (2006.01)

(52) U.S. Cl.
CPC .......... *G01G 21/283* (2013.01); *G01G 21/286* (2013.01); *G01G 23/37* (2013.01); *B01L 2200/141* (2013.01); *B01L 2300/025* (2013.01)

(56) References Cited

U.S. PATENT DOCUMENTS

| | | | | |
|---|---|---|---|---|
| 4,862,978 A * | 9/1989 | Borchard | ............... | G01G 21/30 177/180 |
| 4,862,979 A * | 9/1989 | Borchard | ............... | G01G 21/30 177/181 |
| 5,750,937 A * | 5/1998 | Johnson | ............. | G01G 23/3707 177/199 |
| 5,834,708 A * | 11/1998 | Svetal | ................ | G01G 19/4144 177/180 |
| 6,079,282 A * | 6/2000 | Lanter | ..................... | G01L 1/142 73/780 |
| 6,359,239 B1 * | 3/2002 | Missler | ................. | A47J 47/005 177/177 |
| 6,603,081 B2 * | 8/2003 | Luchinger | ............... | G01G 21/22 177/126 |
| 6,644,547 B1 * | 11/2003 | White | .................... | G06Q 20/04 235/381 |
| 6,674,019 B2 * | 1/2004 | Oldendorf | ............. | G01G 23/36 177/116 |
| 6,833,515 B1 * | 12/2004 | Kesselman | ............ | G01G 21/28 177/126 |
| 6,844,507 B2 * | 1/2005 | Leisinger | ............... | G01G 23/30 177/180 |
| 7,002,084 B2 * | 2/2006 | Cox | ......................... | H05K 5/06 174/50.5 |
| 7,053,364 B2 * | 5/2006 | Gluck | ................... | B08B 15/023 250/221 |
| 7,227,088 B2 * | 6/2007 | Luechinger | .......... | G01G 21/286 177/180 |
| 7,423,226 B2 * | 9/2008 | Rotach | .................... | G01G 23/30 177/180 |
| 8,294,045 B2 * | 10/2012 | Luchinger | ............ | G01G 21/286 177/180 |
| 8,373,678 B2 * | 2/2013 | Yamada | ................ | G06F 1/1616 345/175 |
| 8,785,793 B2 * | 7/2014 | Cox | ......................... | H05K 5/06 174/50.52 |
| 9,092,050 B2 * | 7/2015 | Amada | ...................... | G06F 3/01 |
| 2002/0195281 A1 * | 12/2002 | Zahriya | .................... | G01G 7/06 177/127 |
| 2004/0003947 A1 * | 1/2004 | Kesselman | ............ | G01G 21/28 177/25.13 |
| 2008/0135309 A1 * | 6/2008 | Yuyama | ................ | G01G 21/286 177/1 |
| 2009/0187349 A1 * | 7/2009 | Mainini | .................. | G01G 19/4146 702/19 |
| 2009/0322706 A1 * | 12/2009 | Austin | .................... | G06F 3/038 345/175 |
| 2011/0242010 A1 * | 10/2011 | Chang | ...................... | G01G 3/13 345/173 |
| 2013/0256041 A1 * | 10/2013 | Collins, Jr. | .............. | G07G 1/12 177/2 |
| 2013/0292193 A1 * | 11/2013 | Graf | ...................... | B08B 15/026 177/181 |
| 2015/0201884 A1 * | 7/2015 | Ashokan | .............. | A61B 5/4872 702/19 |

FOREIGN PATENT DOCUMENTS

| | | |
|---|---|---|
| EP | 1 367 372 A1 | 12/2003 |
| FR | 2 889 987 A1 | 3/2007 |
| JP | 2009-115471 A | 5/2009 |

\* cited by examiner

WEIGHING COMPARTMENT WITH INTEGRATED BALANCE

The present application is a Bypass Continuation of International Application No. PCT/EP2012/000328, filed on Jan. 25, 2012, which claims priority from German Patent Application No. 10 2011 000 429.7, filed on Feb. 1, 2011. The contents of these applications are hereby incorporated into the present application by reference in their respective entireties.

FIELD AND BACKGROUND OF THE INVENTION

The invention relates to a weighing compartment having a work surface and having a balance which is integrated into the weighing compartment.

Balances of this type particularly include precision balances which are used in laboratories in the chemical and pharmaceutical industries, and in research. Here they are used to weigh small amounts of substances, for example because a certain amount of a sample is needed for an analysis, or because different substances are to be mixed in a certain ratio. A fundamental problem in these applications is that the precision balance, as well as all the nearby surfaces, must be completely cleaned after the weighing, because otherwise it is not possible to rule out a cross-contamination with substances which are measured in a subsequent weighing process. However, the operating elements (for example, switches) and display devices (for example LCD displays) which have been used up to now are problematic in this regard, because they contain numerous edges which are difficult to clean.

OBJECTS AND SUMMARY OF THE INVENTION

One object of the invention is implementing a weighing compartment of the type indicated above such that it can be reliably cleaned with little effort.

According to one formulation of the invention, this object is addressed by a weighing compartment having a work surface, a balance which is integrated into the weighing compartment, and a scale pan which is arranged on the work surface, and having at least one operation surface which is arranged near the work surface, wherein the work surface is formed by the surface of a smooth, continuous plate, the operation surface is integrated into the work surface and is designed as a sensor panel, and a sensor is arranged below the plate which forms the work surface. The invention makes use of a principle of using no switches, buttons, or the like in the weighing compartment, and rather "to virtualize" these in the form of operation surfaces. In other words, only certain sections of the continuous work surface are provided for functions. As such, it is possible to easily clean the work surface continuously (with the exception of the area of the scale pan), because it contains no manner of edges or other shapes on which particles can attach themselves. The sensor used in the configuration can be a capacitive sensor, an optical sensor, an inductive sensor, or even an acoustic sensor, wherein the sensor is able to detect input data which the operator inputs via the operation surface. By way of example, a capacitive sensor can detect a touch on the operation surface, and the touch is interpreted as confirmation of a previous input. If the operation surface is divided into a plurality of subfields, the sensor surface can also be used in the manner of a touchpad, such that the operator can input numerals or letters.

The operation surface preferably has optical markings. In this way, the operator can always determine where data can be input.

According to one embodiment of the invention, a projection device is functionally assigned to the operation surface and can project different operation symbols onto the operation surface. As such, various input options can be provided in the manner of situation-dependent sub-menus, according to which phase of the weighing process is being used by the operator.

Preferably at least one display surface is included on the work surface. This makes it possible to display, for example, the weight of the sample being weighed at the moment, without there being a need for a physical display device for this purpose, which would in turn be difficult to clean. As an alternative, the display surface can be situated in the rear wall which faces the workspace of the weighing compartment, and can be combined with input surfaces.

The display surface is preferably formed by a transparent window, wherein a display device is arranged underneath this window. In this manner, the display device cannot be dirtied, and the continuous plate which forms the work surface can be washed off easily.

The display device is preferably arranged at a slanting angle to the plane of the plate. In this manner, it can be more easily read by the operator.

According to one embodiment of the invention, the display surface is formed by a translucent area of the plate, and a projector is included which is arranged below the plate and can project an image onto the display surface. This creates more options for a visual display than does a display device.

The display surface is preferably arranged on the side of the scale pan which faces the operator. This is ergonomically advantageous because the operator can read the display surface in the same line of vision in which the scale pan lies.

According to one alternative embodiment, a projector is included which is arranged above the work surface and which can project an image onto the display surface. The advantage of this embodiment is that in principle more space is available above the work surface for the attachment of the projector.

The display surface can also be arranged on the rear wall which faces the working space of the weighing compartment. This is advantageous because there is a small risk that the hands of an operator will shade out an image projected onto the display surface by a projector, when the operator operates the balance. The operation surfaces can also be at least partially arranged on this rear wall.

According to one embodiment of the invention, an identification surface is included, wherein an optical recording device, particularly a camera or a scanner, is functionally assigned to this identification surface. This enables the identification and documentation of samples.

According to a further embodiment of the invention, an identification surface is included which enables an electromagnetic identification of the sample (e.g. RFID).

The plate which forms the work surface preferably consists of glass or glass ceramic. Such a plate has a very smooth and therefore easily cleaned surface which is also very resistant to various different cleaning agents.

According to one embodiment of the invention, auxiliary components can be integrated into the weighing compartment, for example a dosing aide, a device for the discharge of static, a disposal device for samples, a cleaning device, a disinfection device, a device for the detection of toxic and/or microbial impurities, or a decontamination device. In this manner, the weighing compartment becomes a multi-functional work compartment in which it is possible to perform all manipulations of the samples.

According to one embodiment of the invention, a vacuum device is included. This makes it possible to also work with toxic and/or hazardous substances in the weighing compartment.

According to one embodiment of the invention, the scale pan is provided with a wind guard. This can preferably be removed such that the work surface can be easily cleaned.

BRIEF DESCRIPTION OF THE DRAWINGS

The invention is described below in greater detail with reference to two embodiments which are illustrated in the attached drawings, wherein.

DETAILED DESCRIPTION OF EXEMPLARY EMBODIMENTS

Figure 1:
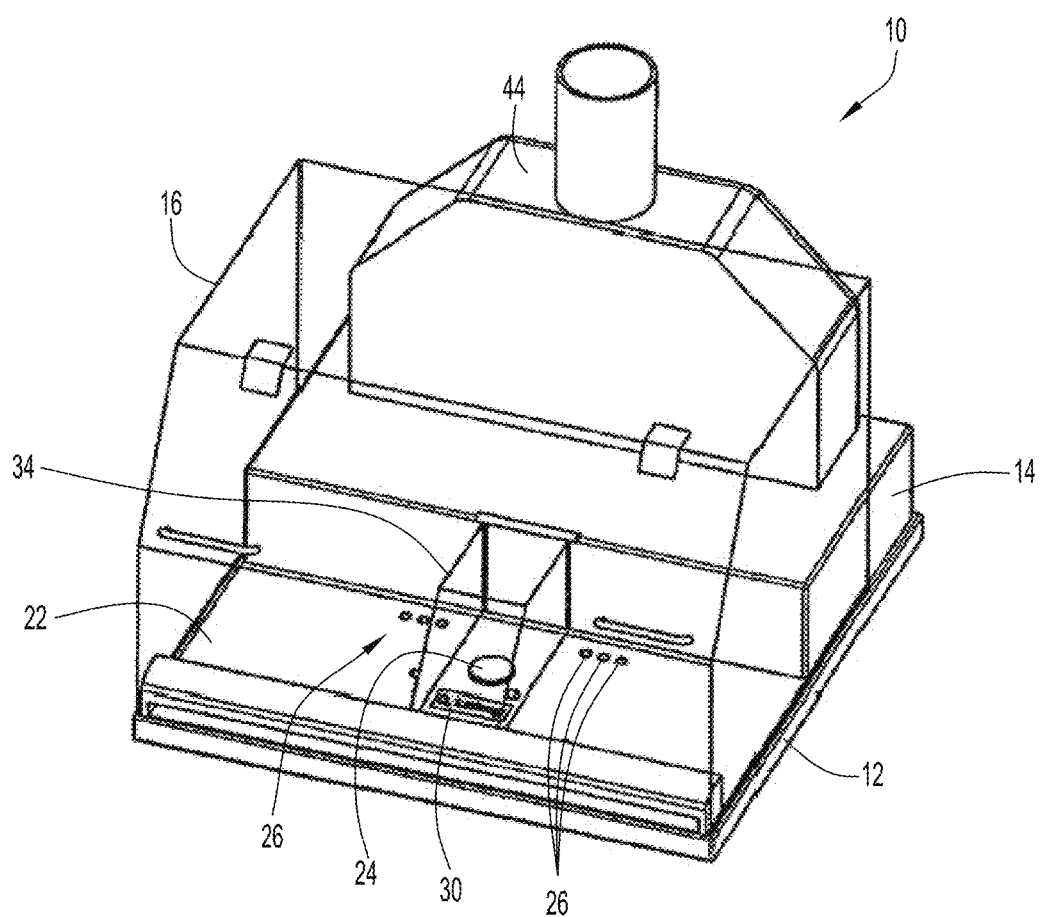
FIG. 1 shows a schematic, perspective view of a weighing compartment according to a first embodiment of the invention.
Figure 2:
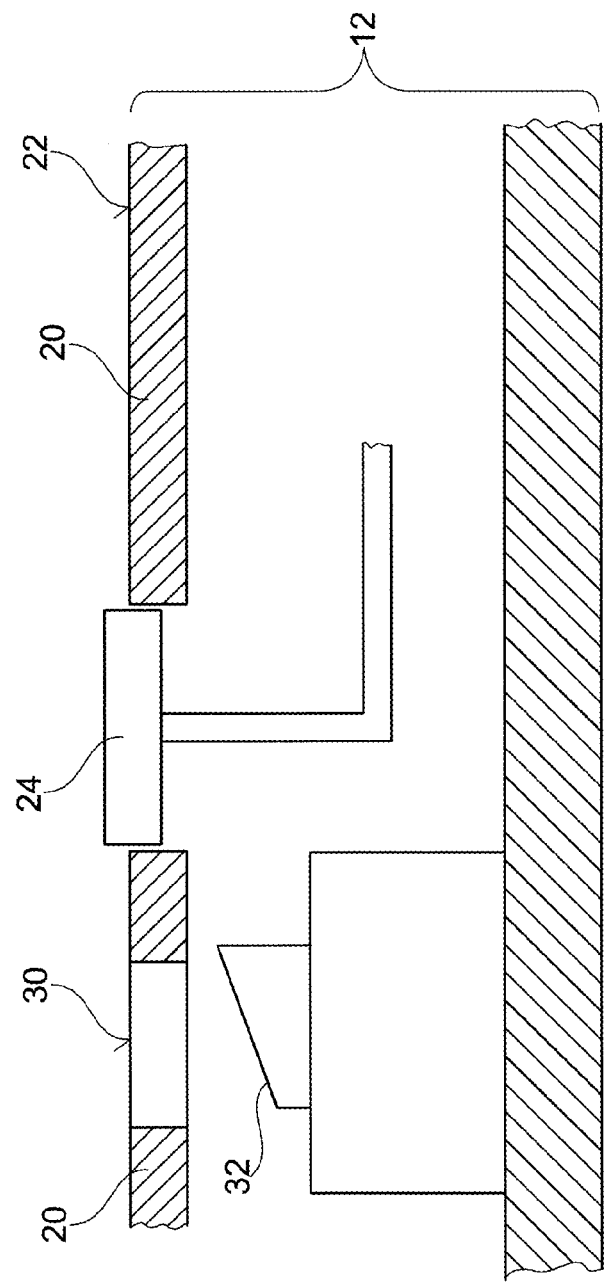
FIG. 2 shows a schematic cutaway view of the work surface of the weighing compartment in FIG. 1, particularly the area of the scale pan.

FIG. 1 shows a weighing compartment 10 which has a base part 12, a housing 14, and multiple compartment walls 16. The base part 12 has a work plate 20 (see FIG. 2 also), wherein the upper side thereof forms a work surface 22. A scale pan 24 is arranged in the work plate 20, particularly in a corresponding recess, and is functionally assigned to a fine balance (not illustrated). Various substances and samples can be weighed by the scale pan 24. The work plate 20 preferably consists of glass or glass ceramic, and is made continuous (except for the recess for receiving the scale pan 24) and even. As such, it has no slots, joints, or other interruptions in which particles can accumulate.

Within the scope of the invention, it is also possible to tether the scale pan in another manner, for example by using a weight sensor which extends out of the housing 14, such that the work surface can be designed as entirely closed.

Figure 3:
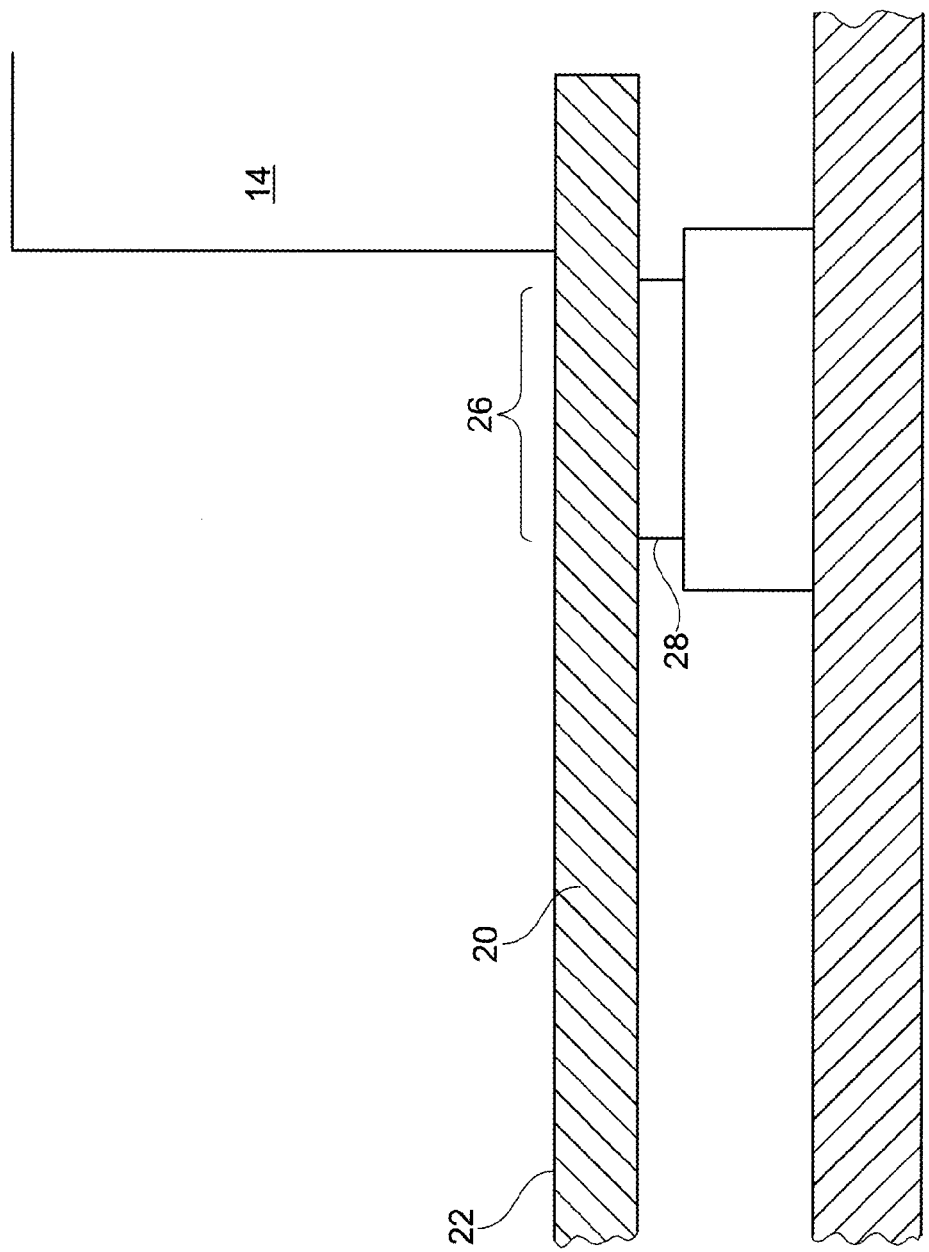
FIG. 3 shows a schematic cutaway view of the work surface of the weighing compartment in FIG. 1, particularly the area of an operation surface.

Multiple operation surfaces 26 are included on the work plate 20, and are designed as visually bounded regions of the continuous work surface 22. A sensor 28 (see FIG. 3) is functionally assigned to the operation surfaces 26, and is arranged below the operation surfaces 26 and can detect a touch or another manner of actuation of the corresponding operation surface 26. The sensor 28 can, for example, be a capacitive sensor, with which the device can detect whether the operation surface 26 is touched by a finger. The sensor 28 can also be an optical sensor, which, similarly to a photo diode, detects whether the operation surface 26 is darkened by a finger of an operator. In principle, other types of sensors are also possible, via which it is possible to detect whether an interaction has occurred with the corresponding operation surface 26. In this case, the operation surface 26 portion of the work plate 20 is suitably constructed to enable the sensor 28 to detect an actuation of the operation surface 26. By way of example, if an optical sensor is used, the work plate 20 can be transparent in the region of the operation surface 26. The sensor 28 can also be directly integrated into the work plate 20, for example in the form of a plurality of capacitive sensor cells through which a touchpad can be implemented. For the purpose of visually bounding the operation surfaces 26, colored markings, for example, can be printed onto the work plate 20, and particularly both on the work surface 22 and on the underside of the work plate 20, if required.

A display surface 30 is also integrated into the work surface 20 (see FIG. 2), wherein the display surface 30 in this case is also designed merely as a defined region of the continuous work surface 22. In the embodiment shown in FIG. 2, the work plate 20 is transparent in the region of the display surface 30, and a display device 32—for example an LCD display—is arranged below the display surface 30, and is preferably set at an angle. This improves the readability. As can be seen in FIG. 1, the display surface 30 is arranged "in front of" the scale pan 24, such that an operator weighing a sample on the scale pan 24 only needs to move his line of sight to a small degree to read the current weight reading.

The scale pan 24 is surrounded by a wind guard 34 in order to prevent a falsification of the weight reading as the result of air movements. The wind guard 34 is preferably removable such that the work plate 20 is easily accessible and can be easily cleaned. The compartment walls 16 can also be removed, such that all components of the weighing compartment can be easily cleaned.

As an alternative to the embodiment of the display surface 30 as a window, the display surface 30 can also be realized as a translucent region of the work plate 20, wherein a projector arranged below said work plate 20 is functionally assigned to the translucent region. This projector projects an image onto the underside of the work plate 20, and the image is then visible on the surface due to the translucent properties thereof. A translucent work plate 20 also makes it possible to depict the operation surfaces 26 with the projection of a corresponding outline onto the work plate from below.

Figure 4:
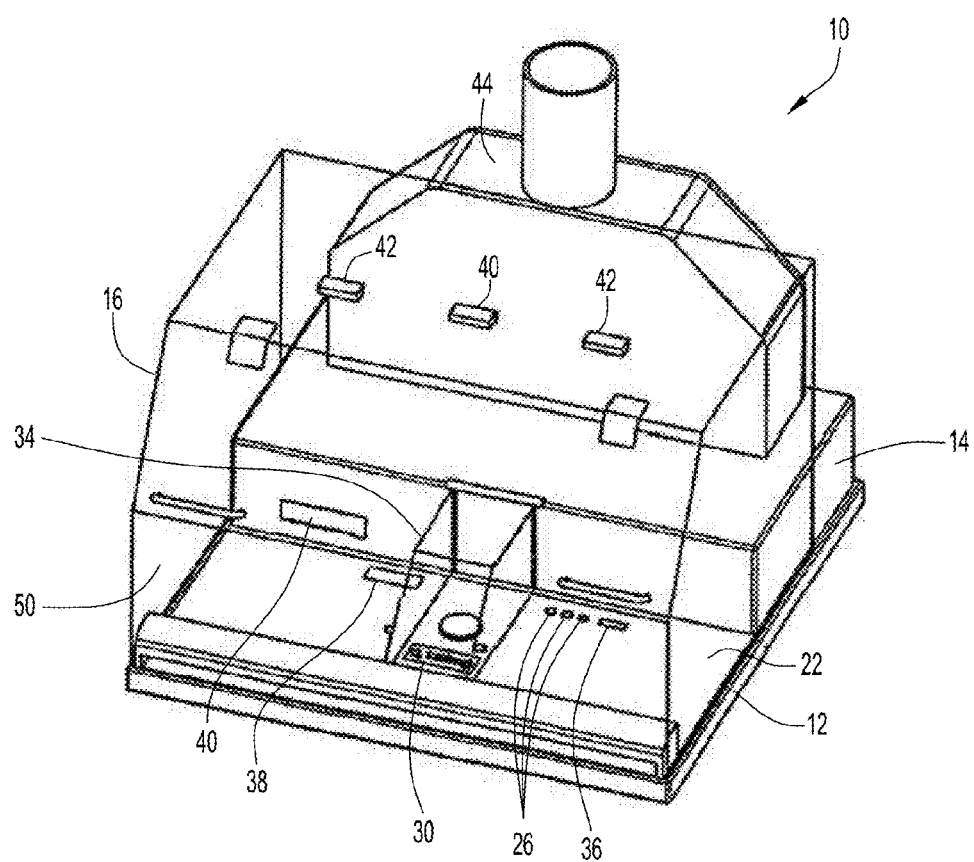
FIG. 4 shows a schematic, perspective view of a weighing compartment according to a second embodiment of the invention.

A weighing compartment according to a second embodiment is shown in FIG. 4, wherein the arrangement of the sensors is not part of the invention per-se. The same reference numbers are used for the components described with reference to the first embodiment, and therefore portions of the explanations provided above apply to this second embodiment as well.

In general, the difference between the first and the second embodiments is that in the second embodiment, the sensors for detecting an input, as well as the display device are arranged above the work plate 20.

In the second embodiment as well, the work plate 20 is designed as a continuous plate, such that the work surface 22 extends with no interruption. Various operation surfaces are included on the work surface 22, wherein an identification surface 36 and a multi-function surface 38 are additionally provided.

In the second embodiment, an interaction with one of the operation surfaces 36 is detected by an optical sensor 42, which is arranged by way of example on a cover of the work compartment. The sensor 42 can be designed as a camera or a laser scanner, and is capable of monitoring the operation panel in order to detect if an operator covers one of the operation surfaces 26 with a finger or another object.

The sensor 42 also performs detections on the identification surface 36, and is capable of detecting a barcode placed there, an identification number, or similar information, which can then be archived, for example, in order to clearly document certain weighing processes.

A second sensor 42 is functionally assigned to the multi-function surface 38, and can detect corresponding inputs in that location. The multi-function surface is characterized in that various information can be displayed on the surface (as a "soft-key panel"), wherein the information can be projected onto the multi-function surface 38 by a projector above or below the work plate—e.g. including instructions in the form of full-text. In this manner, it is possible to adapt each of the input options to the current weighing process and/or to each of the sub-steps in the weighing process, and to realize a comfortable user experience.

According to a combination of the two embodiments described up to this point, inputs can be made on the multi-function surface 38 via sensors 28 which are arranged inside the multi-function surface 28.

A projector 40 is used to display the weight reading, and is likewise, for example, arranged on the cover of the weighing compartment, wherein the weight readout is projected onto the display surface 30. In other words, the work surface 22 in this case functions as the projection surface on which the weight reading is displayed. In addition, a display surface 30 can also be included on a wall 50 of the housing which faces the operator, wherein one of the projectors 40 projects an image onto the display surface 30. Reference numeral 44 identifies a vacuum device. The vacuum device 44 is provided, e.g., for situations in which toxic and/or hazardous substances are located in the weighing compartment.

The above description of various embodiments has been given by way of example. From the disclosure given, those skilled in the art will not only understand the present invention and its attendant advantages, but will also find apparent various changes and modifications to the structures and methods disclosed. The applicant seeks to cover all such changes and modifications as fall within the scope of the invention, as originally disclosed and defined by the appended claims.

The invention claimed is:

1. A weighing compartment comprising:
    a plurality of compartment walls defining and enclosing the weighing compartment,
    a work surface in the weighing compartment and having a balance which is integrated into the weighing compartment and which has a scale pan arranged on the work surface, and
    at least one operation surface which is arranged in a vicinity of the work surface,
    wherein the work surface is formed by the surface of a smooth, continuous plate, the operation surface is integrated into the work surface and is configured as a sensor panel, and
    a sensor arranged below the plate which forms the work surface.

2. The weighing compartment according to claim 1, wherein the operation surface has optical markings.

3. The weighing compartment according to claim 1, wherein the sensor comprises at least one of a capacitive sensor, an optical sensor, an inductive sensor, and an acoustic sensor.

4. The weighing compartment according to claim 1, further comprising a projection device configured to project at least one of operation symbols and text instructions onto the operation surface.

5. The weighing compartment according to claim 1, wherein the work surface comprises at least one display surface.

6. The weighing compartment according to claim 5, further comprising a display device, wherein the display surface comprises a transparent window, and wherein the display device is arranged below the transparent window.

7. The weighing compartment according to claim 6, wherein the display device is arranged at an acute angle to the plane of the plate.

8. The weighing compartment according to claim 5, further comprising a projector, wherein the display surface is formed by a translucent region of the continuous plate, and wherein the projector is arranged below the plate and is configured to project an image onto the display surface.

9. The weighing compartment according to claim 5, wherein the display surface is arranged on a side of the scale pan which faces an operator.

10. The weighing compartment according to claim 5, wherein the display surface is arranged on a rear wall facing a workspace of the weighing compartment.

11. The weighing compartment according to claim 5, further comprising a projector which is arranged above the work surface and which is configured to project an image onto the display surface.

12. The weighing compartment according to claim 1, further comprising an identification surface functionally associated with a recorder device.

13. The weighing compartment according to claim 1, wherein the plate which forms the work surface consists essentially of glass or glass ceramic.

14. The weighing compartment according to claim 1, further comprising at least one auxiliary component integrated into the weighing compartment.

15. A weighing compartment comprising:
    a work surface, having a balance which is integrated into the weighing compartment and which has a scale pan arranged on the work surface,
    at least one operation surface which is arranged in a vicinity of the work surface,
    wherein the work surface is formed by the surface of a smooth, continuous plate, the operation surface is integrated into the work surface and is configured as a sensor panel,
    a sensor arranged below the plate which forms the work surface, and
    a vacuum device configured to remove at least one toxic and/or hazardous substance from the weighing compartment.

16. A weighing compartment comprising:
    a work surface, having a balance which is integrated into the weighing compartment and which has a scale pan arranged on the work surface,
    at least one operation surface which is arranged in a vicinity of the work surface,
    wherein the work surface is formed by the surface of a smooth, continuous plate, the operation surface is integrated into the work surface and is configured as a sensor panel,
    a sensor arranged below the plate which forms the work surface, and
    a wind guard configured to shield at least the scale pan arranged on the work surface.

17. The weighing compartment according to claim 12, wherein the recorder device comprises at least one of a camera, a scanner and an RFID reader.

18. The weighing compartment according to claim 14, wherein the auxiliary component is selected from the group consisting of a dosing aid, a device for discharging static, a disposal device for samples, a cleaning device, a device for the detection of at least one of toxic and microbial impurities, a disinfection device, and a decontamination device.

* * * * *